(12) United States Patent
Masson et al.

(10) Patent No.: US 7,337,069 B2
(45) Date of Patent: Feb. 26, 2008

(54) METHOD OF SIMULATING THE SEDIMENTARY DEPOSITION IN A BASIN RESPECTING THE THICKNESSES OF THE SEDIMENTARY SEQUENCES

(75) Inventors: Roland Masson, Paris (FR); Marie-Christine Cacas, Rueil Malmaison (FR); Gabriela Dobranszky, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 187 days.

(21) Appl. No.: 11/165,264

(22) Filed: Jun. 24, 2005

(65) Prior Publication Data

US 2006/0015260 A1    Jan. 19, 2006

(30) Foreign Application Priority Data

Jun. 30, 2004 (FR) .................................. 04 07221

(51) Int. Cl.
G01V 1/00 (2006.01)
G06G 7/48 (2006.01)
(52) U.S. Cl. ................................ 702/14; 703/6; 367/73
(58) Field of Classification Search ................ 702/14, 702/2, 5, 11–13, 17; 703/6, 10; 367/73
See application file for complete search history.

(56) References Cited

U.S. PATENT DOCUMENTS

| | | | | |
|---|---|---|---|---|
| 4,821,164 A | * | 4/1989 | Swanson | 702/5 |
| 5,475,589 A | * | 12/1995 | Armitage | 702/13 |
| 5,844,799 A | * | 12/1998 | Joseph et al. | 702/2 |
| 6,754,588 B2 | * | 6/2004 | Cross et al. | 702/11 |

(Continued)

FOREIGN PATENT DOCUMENTS

FR    2 744 224    8/1997

(Continued)

OTHER PUBLICATIONS

R. Eymard, et al: "Multi-Lithology Stratigraphic Model Under Maximum Erosion Rate Constraint", International Journal for Numerical Methods in Eingineering, Wiley UK, vol. 60, No. 2, May 2004, pp. 527-548, XP008043580, ISSN: 0029-5981.

(Continued)

Primary Examiner—John Barlow
Assistant Examiner—Toan M. Le
(74) Attorney, Agent, or Firm—Antonelli, Terry, Stout & Kraus, LLP.

(57) ABSTRACT

The method of the invention allows, by means of an iterative inversion algorithm, prediction of the spatial distribution of the lithologic composition of sediments deposited in a sedimentary basin during a geologic time interval, and the temporal evolution of the depositional profile throughout filling of the basin, while respecting exactly the thicknesses of the sedimentary sequences measured otherwise which is useful for locating hydrocarbon reservoirs. Input data of thickness maps of the sedimentary layer, location and composition of the sediment supply at the boundaries of the sedimentary basin, and physical parameters characterizing transport of the sediments during the period of consideration are applied to an iterative inversion loop initialized by the accommodation provided by a stationary multilithologic diffusive model which works as a fixed-point algorithm correcting the accommodations by means of a preconditioning of the residue on the sequence thicknesses obtained by an instationary model.

20 Claims, 8 Drawing Sheets

U.S. PATENT DOCUMENTS 7,117,091 B2 * 10/2006 Masson et al. ............... 702/5
2002/0099504 A1 * 7/2002 Cross et al. ................. 702/2

FOREIGN PATENT DOCUMENTS

FR 2 776 393 9/1999
FR 2 849 211 6/2004

OTHER PUBLICATIONS

A. Quiquerez, et al: "DIBAFILL: A 3-D Two-lithology Diffusive Model for Basin Infilling", Computers & Geosciences Elsevier UK, vol. 26, No. 9-10, Nov. 2000, Dec. 2000, pp. 1029-1042, XP002319037, ISSN: 0098-3004.

* cited by examiner

METHOD OF SIMULATING THE SEDIMENTARY DEPOSITION IN A BASIN RESPECTING THE THICKNESSES OF THE SEDIMENTARY SEQUENCES

BACKGROUND OF THE INVENTION

1. Field of the Invention

The present invention relates to a method for establishing a three-dimensional map of the spatial distribution of the lithologic composition of sediments deposited in a sedimentary basin during a given geologic time interval, as well as the temporal evolution of the depositional profile throughout filling of the basin, while respecting exactly the thicknesses of the sedimentary sequences measured otherwise.

FIG. 1 shows three filling stages of a sedimentary basin. The fill of a sedimentary basin has superposed layers (C1, C2 and C3), also referred to as sedimentary sequences, which correspond each to the deposition of sediments during a sub-time interval of the geologic period required for filling of the basin. Each layer is thus limited by a lower surface (referred to as "base" of the sequence) and an upper surface (referred to as "top" of the sequence). Thus, the top of a sequence coincides with the base of the next sequence. The base of the initial sequence corresponds to the bottom of the basin; it is the "basement" of the basin. These surfaces evolve with time, due to the mechanical deformations undergone by certain sedimentary basins, during or after deposition. Thus, the "subsidence" (S) describes the depth point of the basement in relation to an absolute reference mark linked with the globe (the subsidence varies with time) and the eustasy (E) describes the ocean surface variations recorded simultaneously on all of the earth's surface. The "accommodation" (A) is the vertical distance between the basement (basin bottom) and the sealevel, which also varies with time. The "depositional profile" represents the depositional surface of the sediments at any time and is the topographic surface. Finally, the "bathymetry" (b) describes the vertical distance between the depositional profile and the sealevel.

2. Description of the Prior Art

Recent advances in geology, which gave birth during the past twenty years to seismic stratigraphy, then to genetic stratigraphy, have deeply modified understanding of the history of sedimentary filling of sedimentary basins over large time and space scales, by showing the major influence of two main parameters: the temporal evolution of the accommodation and the sediment supply at the basin boundaries.

Many models and notably deterministic numerical models have been developed to allow apprehending the geometric and lithologic implications of these new approaches.

These numerical models simulate transport and sedimentation (or erosion) of the sediments in the basin, on the basis of a more or less complex description of the nature, from an estimation of the eustasy, of the subsidence and of the sediment supply at the boundaries of the basin studied.

Among these numerical models, the diffusive models have proved efficient through their use in many studies carried out notably for the petroleum industry in order to better and more readily delimit zones likely to contain hydrocarbons. Such models are for example described in the documents hereafter:

Rivenaes, J. C., 1988, *Application of a Dual-Lithology, Depth Dependent Diffusion Equation in Stratigraphic Simulation*, Basin Research, 4, 133-146, in the patents of the applicant: French Patent 2,744,224 and U.S. Pat. No. 5,844,799, and in published patent application No. FR-2,849,211.

The latter two references relate to methods for modelling the filling of sedimentary basins.

These deterministic numerical models are integrated in a procedure for calibrating their input parameters, referred to as "inversion procedure". This inversion procedure is intended to adjust the parameters of the model so that the results provided thereby best fit the reality observed. The temporal evolution of the subsidence and of the sealevel, that is of the accommodation, is among the parameters to be adjusted. The adjustment criterion for the model obtained is based, among other things, on the capacity of the model to reproduce the geometry, and notably the map of the deposited sedimentary unit thicknesses.

This inversion procedure is in most cases of "trial-and-error" type, as described for example in the aforementioned French Patent 2,849,211. It can also be automated as described, for example, in French Patent 2,776,393 filed by the assignee, which relates to a stratigraphic reservoir modelling method, or in the following publication for example:

T. A. Cross and M. A. Lessenger, *Construction and Application of a Stratigraphic Inverse Model*, Numerical Experiments in Stratigraphy; Recent Advances in Stratigraphic and Sedimentologic Computer Simulations, Special Publication—Society for Sedimentary Geology. 62; pp. 69-83.1999.

In the aforementioned methods, implementation of the inversion procedure involves repeated use of the direct model. Furthermore, although these methods improve the agreement between the reality observed and the model obtained, these methods do not ensure a satisfactory agreement between the reality observed and the result of the model.

Notably, the thickness maps of the various sedimentary sequences are generally well constrained in stratigraphic modelling when resultant from interpretation of a seismic survey. Now, exact adjustment of the deposition sequence thickness maps of the model to the maps given by seismic interpretation is absolutely not guaranteed by the inversion procedure. In practice, exact adjustment is nearly never reached. In the case of the trial-and-error type method, the success of the procedure entirely depends on the user's know-how and intuition. This also applies to an automatic procedure and can never succeed if the data initially proposed by the user are too far from the solution.

In response to these major problems of adjustment to the thickness measurements, a modelling procedure based on the stationary diffusion principle is presented in French Patent Application 03/11,194. It provides an approach allowing carrying out a simulation based on a diffusive principle, wherein the sedimentary sequence thickness maps become a datum and not an adjustment parameter. However, this procedure requires a hypothesis according to which the sediments settle at constant rate at any vertical of the sedimentary sequences modelled, which is referred to as stationary diffusion model. This hypothesis may appear to be too restrictive in some situations, notably when the diffusion coefficients characterizing the sedimentary transport efficiency become too small, which is the case in the depositional geometries exhibiting clinoforms, which translate deposition of a sediment as soon as it enters the marine environment, without further reworking.

SUMMARY OF THE INVENTION

The method according to the invention allows, from an instationary diffusive process, to calculate a model of the multilithologic fill of a basin, and the temporal evolution of the depositional profile throughout filling of this basin, while providing rigorous agreement between the thickness maps of the sedimentary sequences and those of the reality observed.

The invention relates to a method for forming a model of the spatial distribution of the lithologic composition of sediments deposited in a sedimentary basin of sedimentary sequences, and the temporal evolution of the bathymetry. The method comprises the following steps:

estimating, from interpretations of measurements resulting from seismic surveys and well data, input data comprising:

maps giving the current thicknesses of the sedimentary sequences, a map of the initial topography of the basement of the sedimentary basin;

a distribution of the sedimentary supply in the basin, comprising at least location in space, lithologic composition, and the evolution of the supply volume in time during filling of the basin;

diffusion coefficient values characterizing the transport of the sediments to said basin; and applying the input data to an iterative inversion procedure, wherein the thicknesses of each of the sequences are calculated by solving instationary diffusive transport equations. In this procedure, the accommodation at the end of each of the sequences is also updated iteratively by preconditioning the residue between the current thicknesses of the sedimentary sequences (estimated beforehand) and the calculated thicknesses.

According to the invention, the accommodation at the end of a given sequence can be initialized by the accommodation at the end of the sequence provided by a stationary diffusive model, and preconditioning can be obtained by application to the residue, on the thicknesses, of a tangent stationary diffusive model.

The initial accommodation of a sequence can be determined by the final accommodation calculated for the sequence located immediately below the sequence considered.

According to the invention, in the stationary and tangent stationary models, the mean values in time of the sedimentary supply for a sequence are considered.

Finally, according to the invention, when close to convergence, preconditioning can be obtained by calculation of the Newton step of the inverse problem, by means, for example, of a GMRES type iterative algorithm preconditioned by a tangent stationary model.

BRIEF DESCRIPTION OF THE DRAWINGS

Other features and advantages of the method according to the invention will be clear from reading the detailed description hereafter of embodiments given by way of non limitative examples, with reference to the accompanying figures wherein:

FIGS. 5A to 5D show the reference maps of a synthetic example wherein

FIG. 5A shows the map of the initial accommodation, and that of the accommodation at the end of the sequence;

FIG. 5B shows the reference solution map for the depositional profile at the end of the sequence;

FIG. 5C shows the mean concentration of the layer in lithology 1; and

FIG. 5D shows the thickness of the sediments;

FIG. 6A illustrates these results for the bathymetry error at the end of the sequence;

FIG. 6B illustrates these results for the accommodation error at the end of the sequence;

FIG. 6C illustrates these results for the mean concentration errors; and

FIG. 6D illustrates these results for the residue on the thickness of the sediments.

DETAILED DESCRIPTION OF THE INVENTION

The method according to the invention allows, from input data comprising layer thickness maps, a map of the bathymetry of the basement at the time of its deposition, a detailed distribution of the sedimentary supply in the basin, and physical parameters characterizing the transport of the sediments, to estimate a model of the multilithologic fill of the basin, as well as the temporal evolution of the depositional profile (topographic surface) throughout filling of the basin. A model of the spatial distribution of the lithologic composition of the sediments comprises an estimation of the accommodation at the end of the sequence and of the surface concentration. The method requires the hypothesis according to which the accommodation varies linearly with time, during each time interval necessary for deposition of a layer (sedimentary sequence). It allows obtaining rigorous agreement between the thickness maps of the sedimentary sequences thus modelled and those of the reality observed. It is important to note that the diffusive process used here is not limited to the context of stationary diffusion with the sedimentation rate not being assumed to be constant here along any vertical line during deposition of a sequence.

The method can be split up into 2 main sequences:

estimating, from seismic survey interpretations and measurements obtained in wells, the following parameters:

the current thicknesses of the sedimentary layers, in depth;

the initial topography of the basin;

the detailed distribution of the sedimentary supply in the basin, as regards its location in space, its lithologic composition, as well as the volume evolution of the supply in time during filling of the basin; and the diffusion coefficient value characterizing the transport of sediments to the basin; and applying the input data to an iterative inversion procedure involving modelling principles with a large-scale diffusive transport equation solution, so as to determine a multilithologic filling model and the temporal evolution of the topographic surface during filling of the basin, while respecting exactly the thicknesses of the sedimentary sequences.

Figure 1:
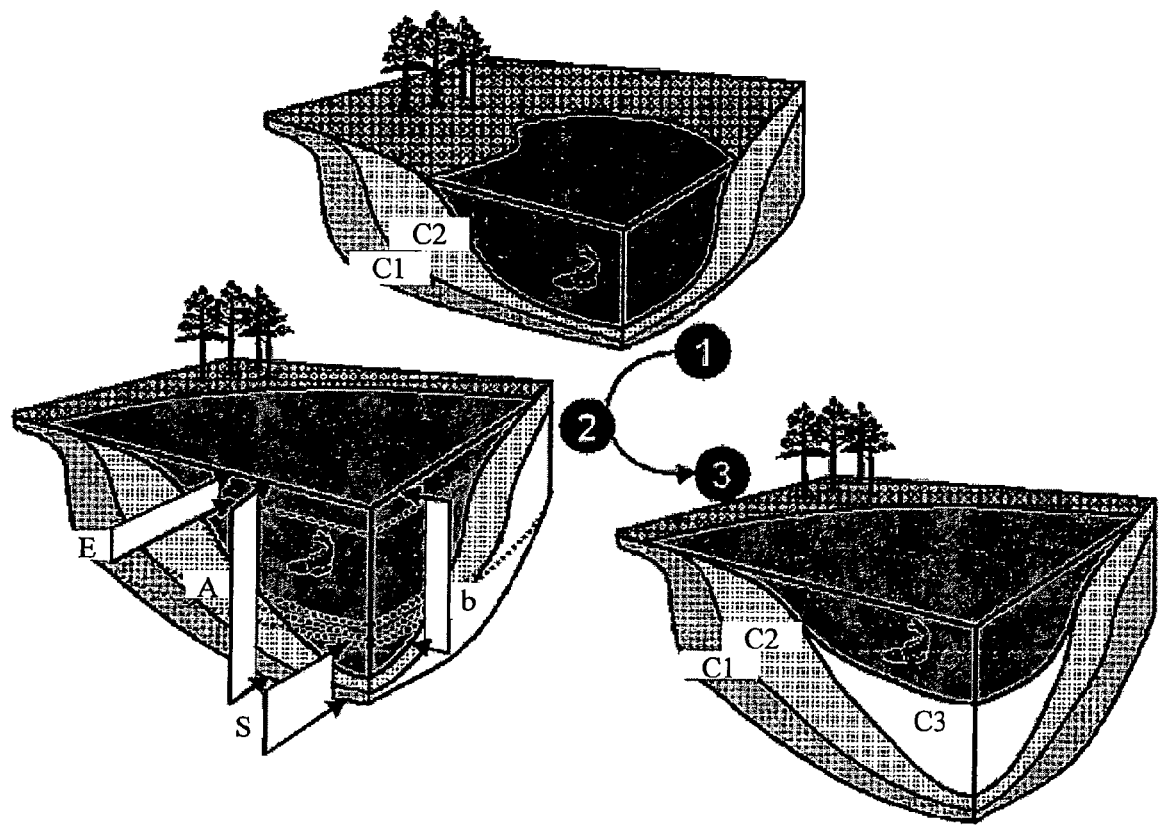
FIG. 1 shows three filling stages of a sedimentary basin.
Figure 2:
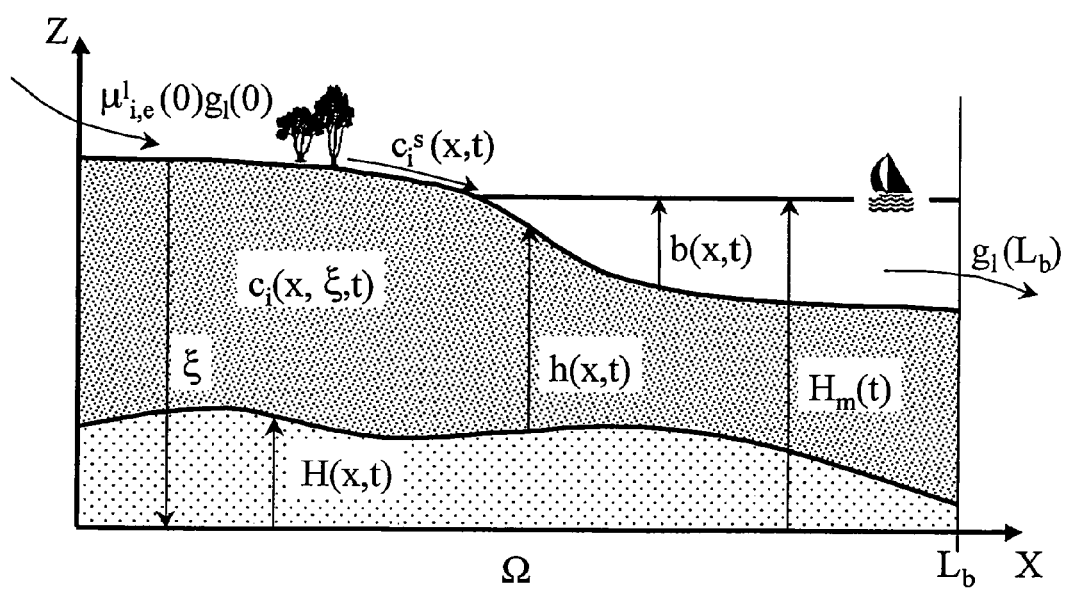
FIG. 2 shows a cross section of a sedimentary basin.

Each one of these two sequences of, estimation of the input data of the iterative procedure on the one hand and determination of the quantities sought by applying the iterative procedure on the other hand, is described in detail hereunder. It is however necessary to define first, with reference to FIG. 2 illustrating a cross section of a sedimentary basin, the notations used hereafter:

l: index of the temporal sequences between the times $t_l$ and $t_{l+1}$ picked by the user $\Omega$: horizontal projection of the basin x: horizontal coordinate (axis X) of a point in $\Omega$ z: vertical coordinate (axis Z) of a point of the basin in a fixed reference system $z=H_m(t)$: sealevel at the time t $z=H(x,t)$: position at the time t of basement (S)=reference surface subjected to tectonic vertical displacements $h(x,t)$: thickness at the time t of the sediments above the basement with $h(x,t_0)=0$.

$b(x,t)=H_m(t)-h(x,t)-H(x,t)$: bathymetry at the time t $\xi$: vertical coordinates of a point of the basin in the reference system having the top of the basin as the origin and pointing downwards ($\xi=z-H(x,t)-h(x,t)$)

L: number of lithologies making up the sediments and bearing index $i=1, \ldots, L$ $c_i(x,\xi,t)$: composition in lithology i of the sediments at point $(x,\xi)$ of the basin at the time t $c_i^s(x,t)$: composition of the sediments at the time t deposited at the surface in case of sedimentation or rising to the surface in case of erosion $n_x$: outgoing normal at boundary $\partial\Omega$ of the basin $a(x,t)=b(x,t)-h(x,t)$: accommodation assumed to be globally continuous in time and linear by fragments in time on each sequence, between times $t_l$ and $t_{l+1}$, so that we write:

$$a(x,t) = \frac{t-t_l}{t_{l+1}-t_l}A_{l+1}(x) + \frac{t-t_{l+1}}{t_l-t_{l+1}}A_l(x).$$

By definition $A_0(x)=b(x,t_0)$.

Estimation of the Input Data of the Iterative Procedure

Determination, by the method according to the invention, of a three-dimensional map of the spatial distribution of the lithologic composition of sediments deposited in a sedimentary basin during a given geologic time interval first requires estimation of the input data as follows:

1. The thickness maps in depth of the sedimentary sequences which are studied, estimated by interpretation of the results of seismic surveys. At each sequence, the cumulative values of the thickness map allow calculation of the total volume of sediments introduced in the basin during the deposition sequence. It should be noted that these thickness maps are generally considered to be the best constrained data in stratigraphic modelling. The thickness of the sediments at the time $t_l$ is denoted by $h_l(x)(h_l(x)=h(x,t_l))$, with $h_0(x)=0$. These are the calibration data of the inverse problem.

2. A map of the topography of the basin basement at the initial time of the filling of this basin, estimated by interpretation of the geologic data obtained by seismic surveys and drilling operations. More precisely, this map is generally obtained by interpolating known punctual bathymetry values by analyzing for example the habitat of the fossilized fauna or the geometry of the fossilized lands (raindrop fossils, fossil wave ripples, traces of washing of marine organisms, sands deposited in the meander of a river, etc.), taken during coring or observed by means of measuring tools lowered in boreholes. The bathymetry of the basin at the initial time is denoted by: $b^0(x)=b(x,t_0)$. Finally, the user has to specify a bathymetry value at any point $x_0^l$ of the basin and at any time $t_l$ denoted by $b_0^l=b(x_0^l,t_l)$.

3. A detailed distribution of the sediment supply (AS) in the basin, as regards its location in space, its lithologic composition, as well as the evolution of the supply volume in time during filling of the basin. The proportion of the global volume of sediments carried, at any point of the basin boundary, by rivers or runoff water, is described. Sediments directly incorporated in the basin, as it is the case for the growth of carbonate reefs, can also be taken into account. The sediment supply is also characterized by its lithologic composition (respective proportions of sand, clay and carbonate for example), which is also variable in space and in time. For example, 25% of the sediments can be introduced in a central zone of the basin with a 100% carbonate composition, and 75% of the remaining sediments can be introduced uniformly at the basin boundary and consist of 50% sand and 50% clay. These data are furthermore estimated through the synthesis of seismic survey results, geologic measurements performed on core samples and/or well logs obtained while drilling, and geologic observations on outcrops. These data are thus:

$g_l(x)$: total flow of sediments (incoming <0 or outgoing >0) defined at boundary $\partial\Omega$ $S_l(x)$: source term of total production (>0) or total consumption (<0) of sediments defined in domain $\Omega$ $\partial\Omega_e^l=\{x\in\partial\Omega, g_l(x)<0\}$: incoming sediment boundary $\partial\Omega_s^l=\{x\in\partial\Omega, g_l(x)\geq 0\}$: outgoing sediment boundary $\Omega_p^l=\{x\in\Omega, S_l(x)>0\}$ sediment production subdomain of $\Omega$ $\Omega_c^l=\{x\in\Omega, S_l(x)\leq 0\}$: sediment consumption subdomain of $\Omega$ $\mu_{i,e}^l(x)\geq 0$ $$\left(\text{with } \sum_{i=1}^{L}\mu_{i,e}^l(x) = 1\right):$$

flow fraction entering lithology i defined on boundary portion $\partial\Omega_e^l$ $\mu_{i,p}^l(x)\geq 0$ $$\left(\text{with } \sum_{i=1}^{L}\mu_{i,e}^l(x) = 1\right):$$

production fraction in lithology i defined in subdomain $\Omega_p^l$.

$S_i^l(x,t)$ denotes the source term equal to $\mu_{i,p}^l(x)S_l(x)$ on $\Omega^{p,l}$ and to $c_i^s(x,t)S_l(x)$ on $\Omega_c^l$.

In case of erosion of the first layer, the initial composition at $t_0$ of the eroded sediments: $c_i(x, \xi, t_0)$ also has to be specified.

4. Physical parameters characterizing transport of the sediments during the period being considered: the diffusion coefficients in the marine environment and in the continental environment. More precisely, there are two diffusion coefficients per lithology: a diffusion coefficient valid in the marine environment and a diffusion coefficient valid in an underwater environment (lacustrine or marine). These coefficients quantify the sediment transport efficiency in continental and marine environments at the geologic period considered. These coefficients are estimated prior to application of the method, either empirically, or by manual inversion of a simplified direct model such as, for example, the stationary model described hereafter. The diffusion coefficients of lithology i in marine and continental environments are denoted by: $k_{i,m}^l$, $k_{i,c}^l$. Ratio $$r_{m,c}^l = \frac{k_{i,m}^l}{k_{i,c}^l}$$

is assumed to be independent of lithology i.

All these input data are necessary for description of the models used in the iterative procedure.

Figure 3:
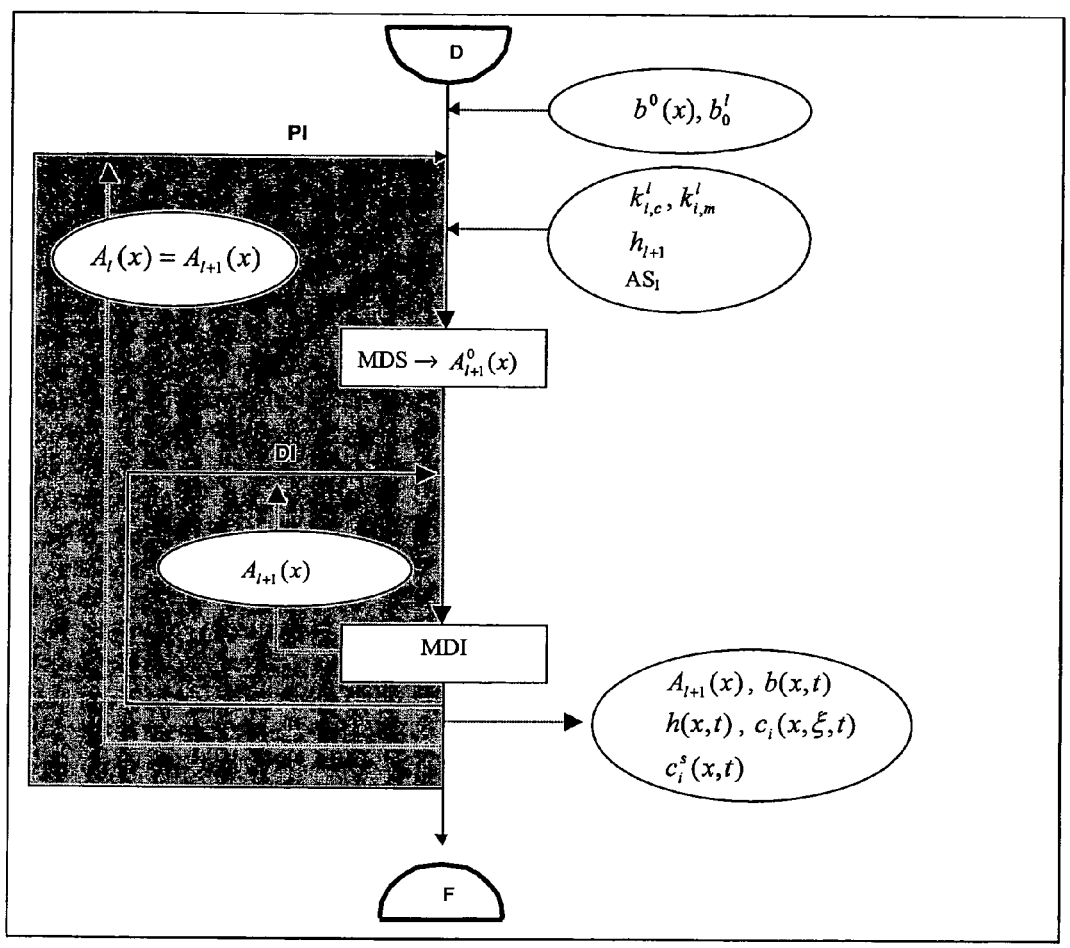
FIG. 3 illustrates the succession of stages and the flow of data of the method according to the invention.

FIG. 3 illustrates the succession of sequences and the flow of data of the method according to the invention. The initial topographic profile, that is the initial topographic surface, is given at the input of the global procedure, that is upstream from the first iteration level, whereas the other data (thickness map of the layer considered ($h_{l+1}$), diffusion coefficients ($k_{i,m}^l$, $k_{i,c}^l$) and sedimentary supply ($AS_l$) of the layer considered) are provided at the first iteration level.

Application of the Iterative Procedure

This set of data is supplied to an iterative inversion procedure comprising two iteration levels. The first iteration level processes the layers successively in their chronological order of deposition (FIG. 3). Then, for each layer, a second level of iterations is applied which involves, upon each step, an instationary multilithologic diffusive numerical model (FIG. 3) such as the model presented in French Patent 2,744,224, as well as stationary and tangent stationary multilithologic diffusive numerical models (FIG. 4) described in French Patent Application 03/11,194. The objective of this second iteration level is to adjust the accommodation at the end of the layer deposition, so as to strictly respect the thickness of the layer.

Prior to presenting the whole iterative inversion procedure, it is necessary to describe the three models used in the iteration loop.

Hereafter a given sequence between the times $t_l$ and $t_{l+1}$ is considered, knowing that accommodation $A_l(x)$ is assumed to be known by either the calculation carried out on the previous layer, or by the bathymetry at the initial time if l=0. By definition function $\psi$ $$\psi(b) = \begin{cases} -r_{m,c}^l b & \text{if } b > 0, \\ -b & \text{if } b \leq 0. \end{cases}$$

1—Instationary Multilithologic Diffusive Direct Model

This model is the one described in the Rivenaes reference. Given $g_l(x)$, $S_l(x)$, $\mu_{i,e}^l(x)$, $\mu_{i,p}^l(x)$, $r_{m,c}^l$, $k_{i,c}^l$, the variables calculated at the previous layer (or given at the initial time) $c_i(x,\xi,t_l)$, $b(x,t_l)$, $A_l(x)$ and the unknown of the inverse problem of the sequence $A_{l+1}(x)$, this model determines for any time of the sequence the thickness $h(x,t)$, the bathymetry $b(x,t)$, the surface composition $c_i^s(x,t)$ and the composition of the basin $c_i(x,\xi,t)$ solution to the system.

$$\begin{cases} \partial_t h(x,t)c_i(x,0,t) + \text{div}(-k_{i,c}^l c_i^s(x,t)\nabla\psi(b(x,t))) = S_i^l(x,t) \text{ on} \\ \qquad \Omega \times (t_l, t_{l+1}), \\ \sum_{i=1}^L c_i^s(x,t) = 1 \text{ on } \Omega \times (t_l, t_{l+1}), \\ \sum_{i=1}^L -k_{i,c}^l c_i^s(x,t)\nabla\psi(b(x,t))\cdot n_x = g_l(x) \text{ on } \partial\Omega_s^l \times (t_l, t_{l+1}), \\ -k_{i,c}^l c_i^s(x,t)\nabla\psi(b(x,t))\cdot n_x = \mu_{i,e}^l(x)g_l(x) \text{ on } \partial\Omega_e^l \times (t_l, t_{l+1}), \\ b(x, t=t_l) = b(x, t_l) \text{ on } \Omega, \\ b(x,t) - h(x,t) = \frac{t - t_l}{t_{l+1} - t_l}A_{l+1}(x) + \frac{t - t_{l+1}}{t_l - t_{l+1}}A_l(x) \text{ on } \Omega \times (t_l, t_{l+1}), \end{cases}$$

$$\begin{cases} \partial_t c_i(x,\xi,t) + \partial_t h(x,t)\partial_\xi c_i(x,\xi,t) = 0 \text{ on} \\ \qquad \Omega \times (0, +\infty) \times (t_l, t_{l+1}), \\ c_i(x, 0, t) = c_i^s(x,t) \text{ if } \partial_t h(x,t) > 0, \\ c_i(x,\xi, t=t_l) = c_i(x,\xi,t_l). \end{cases}$$

The solution to the instationary model (INST) in condensed form is denoted by:

$$\begin{bmatrix} b(x,t) \\ h(x,t) \\ c_i^s(x,t) \\ c_i(x,\xi,t) \end{bmatrix} = \text{INST} \begin{bmatrix} g_l(x), S_l(x), \mu_{i,e}^l(x), \mu_{i,p}^l(x) \\ r_{m,c}^l, k_{i,c}^l \\ b(x,t_l), c_i(x,\xi,t_l), A_l(x) \\ A_{l+1}(x) \end{bmatrix}.$$

2—Stationary Multilithologic Diffusive Model

It is the approximation of the instationary model obtained by considering that the sedimentation rate is independent of t in the sequence and that the concentration of the previous layer is independent of $\xi$ (in case of erosion of the previous sequence). The model described hereafter then provides directly, without inversion loop, an approximation to the accommodation at the end of the sequence $A_{l+1}(x)$.

Given $g_l(x)$, $S_l(x)$, $\mu_{i,e}^l(x)$, $\mu_{i,p}^l(x)$, $r_{m,c}^l$, $k_{i,c}^l$, the sediment thicknesses $h_l(x)$ and $h_{l+1}(x)$, the bathymetry $b_0^{l+1}$ at a point $x_0^{l+1}$ of the basin at the time $t_{l+1}$, and the concentration calculated at the previous layer (or given at the initial time) $c_i(x,\xi,t_l)$, the model determines the accommodation at the end of the sequence $A_{l+1}(x)$ solution to the system:

$$\begin{cases} \text{div}(-k_{i,c}^l d_i^s(x)\nabla\phi(x)) = -\frac{h_{l+1}(x) - h_l(x)}{t_{l+1} - t_l}d_i(x) + S_l(x)q_i(x) \text{ on } \Omega, \\ \sum_{i=1}^L d_i^s(x) = 1 \text{ on } \Omega, \\ \sum_{i=1}^L -k_{i,c}^l d_i^s(x)\nabla\phi(x)\cdot n_x = g_l(x) \text{ on } \partial\Omega_s^l, \\ -k_{i,c}^l d_i^s(x)\nabla\phi(x)\cdot n_x = \mu_{i,e}^l(x)g_l(x) \text{ on } \partial\Omega_e^l, \\ A_{l+1}(x) = \psi^{-1}(\phi(x)) + h_{l+1}(x) \text{ on } \Omega, \\ \psi^{-1}(\phi(x_0^{l+1})) = b_0^{l+1}, \end{cases}$$

with

-continued $$q_i(x) = \begin{cases} d_i^s(x) \text{ on } \Omega_c^l, \\ \mu_{i,p}^l(x) \text{ on } \Omega_p^l, \end{cases}$$

and $$d_i(x) = \begin{cases} d_i^s(x) \text{ if } h_{l+1}(x) \geq h_l(x), \\ \frac{1}{h_{l+1}(x) - h_l(x)} \int_{h_l(x)}^{h_{l+1}(x)} c_i(x, \xi, t_l) d\xi \text{ if } h_{l+1}(x) < h_l(x). \end{cases}$$

The solution to this stationary system (STAT) in condensed form is denoted by:

$$A_{l+1}(x) = STAT \begin{bmatrix} g_l(x), S_l(x), \mu_{i,e}^l(x), \mu_{i,p}^l(x) \\ r_{m,c}^l, k_{i,c}^l \\ c_i(x, \xi, t_l), h_l(x) \\ b_0^{l+1}, x_0^{l+1} \\ h_{l+1}(x) - h_l(x) \end{bmatrix}.$$

3—Tangent Stationary Multilithologic Diffusive Model

The correction $\delta A$ of the final accommodation is obtained by solution of the tangent application of the equations of the stationary model defined at the current point according to:

$$(e_l(x), b_{l+1}(x), c_i^{s,l+1}, c_i^{l+1}(x))$$

where $e_l(x)$ represents the thickness of the sequence, $b_{l+1}(x)$ the bathymetry at the end of the sequence, $c_i^{s,l+1}$ the surface concentration at the end of the sequence and where $c_i^{l+1}(x)$ coincides with surface concentration $c_i^{s,l+1}(x)$ if $e_l(x) > 0$ and represents the eroded mean concentration in the sequence if $e_l(x) \leq 0$.

Given the current point $(e_l(x), b_{l+1}(x), c_i^{s,l+1}, c_i^{l+1}(x))$, the diffusion parameters $r_{m,c}^l$, $k_{i,c}^l$, point $x_0^{l+1}$, the outgoing flows $g_l(x)$ on $\partial \Omega_s^l$, the consumption terms $S_l(x)$ on $\Omega_c^l$, and the residue on the sediment thicknesses denoted by $R(x)$, the tangent model calculates the correction of the final accommodation $\delta A$ solution to the linear system as follows:

$$\begin{cases} -k_{i,c}^l div[\delta d_i^s(x) \nabla \psi(b_{l+1})(x) + c_i^{s,l+1}(x) \nabla \delta \phi(x)] = \\ \quad -\frac{R(x)}{t_{l+1} - t_l} c_i^{l+1}(x) - e_l(x) \delta d_i(x) + S_l(x) \delta q_i(x) \text{ on } \Omega, \\ \sum_{i=1}^{L} \delta d_i^s(x) = 0 \text{ on } \Omega, \\ \sum_{i=1}^{L} -k_{i,c}^l c_i^{s,l+1}(x) \nabla \psi(b_{l+1}(x)) \cdot n_x = g_l(x) \text{ on } \partial \Omega_s^l, \\ -\sum_{i=1}^{L} -k_{i,c}^l [\delta d_i^s(x) \nabla \psi(b_{l+1}(x)) + c_i^{s,l+1}(x) \nabla \delta \phi(x)] n_x = 0 \text{ on } \partial \Omega_s^l, \\ -k_{i,c}^l [\delta d_i^s(x) \nabla \psi(b_{l+1}(x)) + c_i^{s,l+1}(x) \nabla \delta \phi(x)] \cdot n_x = 0 \text{ on } \partial \Omega_e^l, \\ \delta A(x) = \frac{\delta \phi(x)}{\frac{d\psi}{db}(b_{l+1}(x))} + R(x) \text{ on } \Omega, \\ \delta A(x_0^{l+1}) = 0, \end{cases}$$

with $$\delta d_i(x) = \begin{cases} \delta d_i^s(x) \text{ if } e_l(x) > 0 \\ 0 \text{ if } e_l(x) \leq 0, \end{cases} \text{ and } \delta q_i(x) = \begin{cases} \delta d_i^s(x) \text{ if } x \in \Omega_c^l \\ 0 \text{ if } x \in \Omega_p^l \end{cases}.$$

The solution to the tangent stationary model (STATTGT) in condensed form is denoted by:

$$\delta A(x) = STATTGT \begin{bmatrix} e_l(x), b_{l+1}(x), c_i^{s,l+1}(x), c_i^{l+1}(x) \\ r_{m,c}^l, k_{i,c}^l \\ g_l(x), S_l(x) \\ x_0^{l+1} \\ R(x) \end{bmatrix}.$$

FIG. 3 shows the flowsheet of the method according to the invention:

Description of the Two Iteration Levels of the Iterative Inversion Loop

1—First Iteration Level: Iterations on the Layers

A first iteration level (PI) process the layers successively in their chronological order of deposition, that is upwards. FIG. 3 illustrates this iteration level. The input data for this iteration level has the thickness map of the layer considered ($h_{l+1}$), the sedimentary supply ($AS_1$) and the diffusion coefficients of the layer considered.

2—Second Iteration Level: Iterations on the Accommodation

Figure 4:
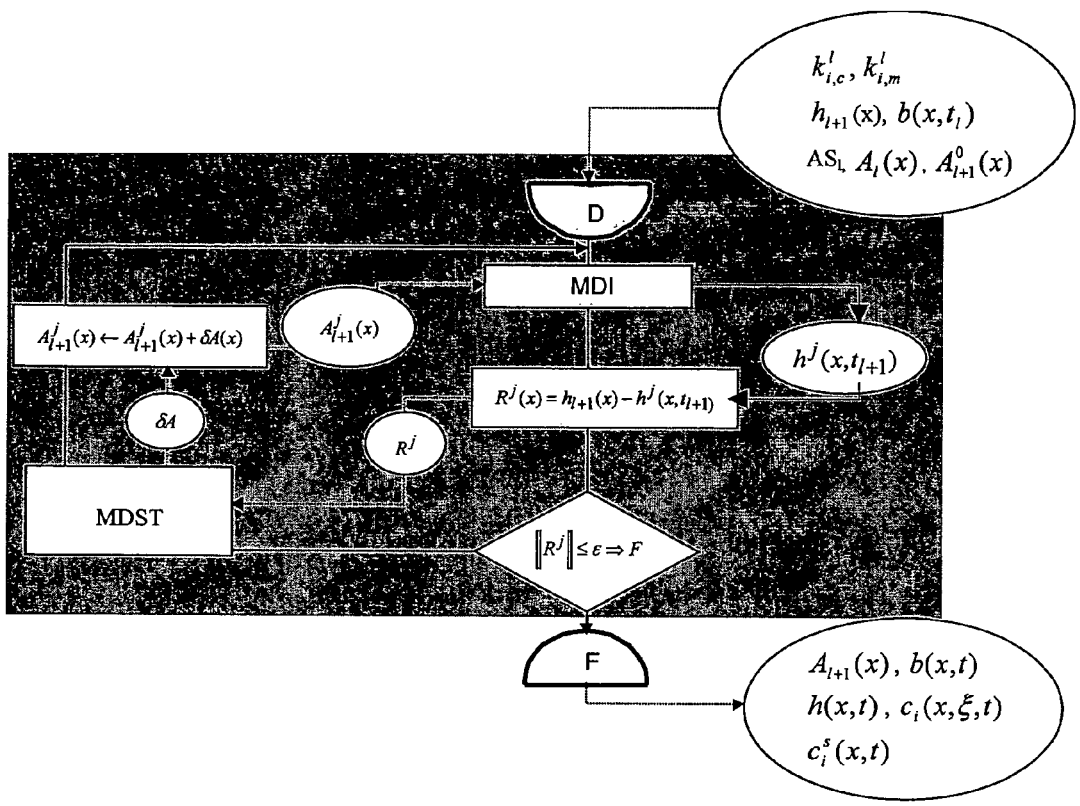
FIG. 4 shows in detail the second iterative loop of the inversion procedure.

As illustrated by FIGS. 3 and 4, for each layer, a second iteration level is applied (DI) comprising, at each step, using an instationary multilithologic diffusive numerical model (MDI) such as the model presented in French Patent 2,744, 224, and stationary and tangent stationary multilithologic diffusive numerical models presented above. This second iteration level is illustrated by FIG. 3 and more in detail at iteration j by FIG. 4. Its objective is to adjust the accommodation at the end of the deposition of layer ($A_{l+1}(x)$), so as to strictly respect the thickness of layer ($h_{l+1}$). This procedure is mainly based on the following hypotheses, for a sequence considered (1$^{st}$ iteration level):

1. The diffusion coefficients are constant in time during the sequence considered.
2. The accommodation varies linearly with time during deposition of the sequence studied. The initial accommodation is entirely determined by the final accommodation calculated for the layer located immediately below the layer considered. If the layer considered is the bottomset layer, the initial accommodation is given by the deposition profile at the initial time, which is an input datum of the procedure. The final accommodation is adjusted by means of the iterative procedure relative to the layer considered.

The input data for this iteration level has $g_l(x)$, $S_l(x)$, $\mu_{i,e}^l(x)$, $\mu_{i,p}^l(x)$, $r_{m,c}^l$, $k_{i,c}^l$, the variables calculated at the previous layer (or given at the initial time) $c_i(x, \xi, t_l)$, $b(x, t_l)$ and $A_l(x)$. In the direct sense, the instationary model assumes the accommodation at the end of each sequence $A_{l+1}(x)$ to be known in addition to the data defined above. It is this accommodation that is inverted at each sequence by the inversion loop. $A_{l+1}(x)$ is thus the unknown of the inverse problem of the sequence. The goal of the inversion loop is thus to solve the problem of calibration to the thicknesses given by the instationary model: find the accommodation at the end of the sequence $A_{l+1}(x)$ such that:

$$\begin{cases} h(x, t_{l+1}) = h_{l+1}(x), \\ \begin{bmatrix} b(x, t) \\ h(x, t) \\ c_i^s(x, t) \\ c_i(x, \xi, t) \end{bmatrix} = INST \begin{bmatrix} g_l(x), S_l(x), \mu_{i,e}^l(x), \mu_{i,p}^l(x) \\ r_{m,c}^l, k_{i,c}^l \\ b(x, t_l), c_i(x, \xi, t_l), A_l(x) \\ A_{l+1}(x) \end{bmatrix}. \\ b(x_0^{l+1}, t_{l+1}) = b_0^{l+1} \end{cases}$$

The inversion loop is initialized by accommodation $A_{l+1}^0(x)$ provided by the stationary multilithologic diffusive model (MDS, FIG. 3). The input data described above allow calculation directly, without an inversion loop, via the stationary multilithologic diffusive model, an approximation to the accommodation at the end of the sequence $A_{l+1}^0(x)$, which will thereafter be updated in the iterative loop:

$$A_{l+1}^0(x) = A_{l+1}(x) = STAT \begin{bmatrix} g_l(x), S_l(x), \mu_{i,e}^l(x), \mu_{i,p}^l(x) \\ r_{m,c}^l, k_{i,c}^l \\ c_i(x, \xi, t_l), h_l(x) \\ b_0^{l+1}, x_0^{l+1} \\ h_{l+1}(x) - h_l(x) \end{bmatrix}$$

This loop works, after initialization, as a fixed-point algorithm correcting the successively calculated accommodations $(A_{l+1}(x))$ by preconditioning residue (R) on the thicknesses of sequence $(h_{l+1})$ until a sufficiently low residue (below $\epsilon$) is obtained on the thicknesses. Preconditioning is obtained by applying the tangent application of the stationary multilithologic model (MDST) to the residue on the thicknesses.

At the output of the inversion loop, the accommodation is obtained at the end of the sequence considered $A_{l+1}(x)$, as well as the bathymetry $b(x,t)$ and the concentration (surface composition) $c_i^s(x,t)$ solutions, at any time of the sequence of the instationary model calibrated to the thickness of layer $h_{l+1}$.

The algorithm is a fixed point initialized by the stationary model and preconditioned by the tangent stationary model:

Initialization:

$$A_{l+1}(x) = STAT \begin{bmatrix} g_l(x), S_l(x), \mu_{i,e}^l(x), \mu_{i,p}^l(x) \\ r_{m,c}^l, k_{i,c}^l \\ c_i(x, \xi, t_l), h_l(x) \\ b_0^{l+1}, x_0^{l+1} \\ h_{l+1}(x) - h_l(x) \end{bmatrix} = A_{l+1}^0(x)$$

$R = \infty$ (R is the residue on the thicknesses of the sequences)

$\epsilon$ is given. $\epsilon$ is a low value acceptable for residue R

Loop:

AS LONG AS $\|R\| \geq \epsilon$

Calculation of Residue R and of the Calculation Point of the Tangent Stationary Model:

$$\begin{bmatrix} b(x, t) \\ h(x, t) \\ c_i^s(x, t) \\ c_i(x, \xi, t) \end{bmatrix} = INST \begin{bmatrix} g_l(x), S_l(x), \mu_{i,e}^l(x), \mu_{i,p}^l(x) \\ r_{m,c}^l, k_{i,c}^l \\ b(x, t_l), c_i(x, \xi, t_l), A_l(x) \\ A_{l+1}(x) \end{bmatrix},$$

$R(x) = h_{l+1}(x) - h(x, t_{l+1})$, $b_{l+1}(x) = b(x, t_{l+1})$, $e_{l+1}(x) = h(x, t_{l+1}) - h_l(x)$, $c_i^{s,l+1}(x) = c_i^s(x, t_{l+1})$, $$c_i^{l+1}(x) = \begin{cases} c_i^{s,l+1}(x) & \text{if } e_{l+1}(x) \geq 0, \\ \dfrac{1}{e_{l+1}(x)} \int_{h_l(x)}^{h(x,t_{l+1})} c_i(x, \xi, t_l) d\xi & \text{if } e_{l+1}(x) < 0, \end{cases}$$

Preconditioning:

$$\delta A(x) = STATTGT \begin{bmatrix} e_l(x), b_{l+1}(x), c_i^{s,l+1}(x), c_i^{l+1}(x) \\ r_{m,c}^l, k_{i,c}^l \\ g_l(x), S_l(x) \\ x_0^{l+1} \\ R(x) \end{bmatrix}$$

Accommodation Correction:

$A_{l+1}(x) \leftarrow A_{l+1}(x) + \delta A(x)$

END AS LONG AS

The numerical scheme used for this algorithm is the scheme in space (equations discretization scheme on the domain defined by the basin) described for example in the aforementioned reference Eymard et al. It is similar to the scheme introduced in Rivanaes' work, also already mentioned. It is suited to grids of the Cartesian $\Omega$ domain, CPG (Corner Point), triangular, with or without local refinement.

NB a. Without preconditioning, the correction would be simply written as follows:

$A_{l+1}(x) \leftarrow A_{l+1}(x) + R(x) - R(x_0^{l+1})$.

It can be shown that, in the linear ($r_{m,c}^l = 1$) monolithologic (L=1) case, the convergence rate of the preconditioned algorithm is at least 0.5 whatever the parameters of the problem (diffusion coefficient, $\Omega$ domain, time interval of the sequence, . . . ), whereas the convergence rate of the algorithm without preconditioning tends to 1 when $$\frac{k_c^l(t_{l+1} - t_l)}{\text{Diameter}(\Omega)}$$

tends to zero and is therefore not robust. Furthermore, we show that, if we choose a diffusion coefficient of the tangent model equal to 0.55 times that of the instationary model for the preconditioning stage, the convergence rate of the preconditioned algorithm is always at least 0.1.

b. It can be shown that, in the linear ($r_{m,c}^l = 1$) monolithologic (L=1) case, that the inverse problem of exact calibration of the thicknesses of the layer is well stated in the sense that the high-frequency noise on the data is not amplified.

c. The algorithm is readily extended in cases where the supply should also depend on the time within the sequence. The mean values in time just have to be considered in the sequence in the stationary and tangent stationary approached models.

d. For very small ratios $$r^l_{m,c} = \frac{k^l_{i,m}}{k^l_{i,c}}$$

(less than or equal to 0.01), the fixed-point algorithm preconditioned by the tangent stationary model can be improved in terms of robustness by adding thereto a stage of linear search in direction δA. Precisely, the aim of this linear search is to find a value of α∈]0,1] such that the norm, denoted by f(α), of the residue on the thicknesses obtained with the update $A_{l+1}(x)+\alpha\delta A(x)$ of the accommodation at the end of the sequence decreases.

e. The fixed-point algorithm preconditioned by the tangent stationary model can be accelerated when sufficiently close to convergence. Typically, being close to convergence occurs when the residue on the thicknesses or the norm of step δA has decreased by a factor of the order of 10 to 100. This acceleration is obtained by calculating the Newton step of the inverse problem defined by:

$$\delta A_{Newton} = -\left[\frac{\partial h(.,t_{l+1})}{\partial A_{l+1}}\right]^{-1} R$$

This calculation can be carried out by an iterative GMRES algorithm preconditioned by the tangent stationary model, as described in the following document:

Y. SAAD, *GMRES: A Generalized Minimal Residual Algorithm for Solving Nonsymmetric Linear Systems*, SIAM J. Sci. Statist. Comput., 7 (1986), pp. 856-869.

Thus obtained is a quadratic convergence of the thicknesses residue, when quite close to the solution: asymptotically, the norm of the residue on the thicknesses, at a given iteration, is of the order of the square of that of the previous iteration.

APPLICATION EXAMPLE

First, a synthetic example on a single layer of a 3D basin is constructed, allowing to appreciate the results of the invention. Domain Ω is a rectangle $(0,L_x)\times(0,L_y)$ with $L_x$=100 km and $L_y$=50 km. The incoming flows at the boundaries are −1,5 m²/year on side x=0, −0,75 m²/year on side y=50 km, and the outgoing flows are zero on the other two sides. The sediments have two lithologies (L=2) of diffusion coefficients $k_{1,c}$=500 m²/year, $k_{2,c}$=50 m²/year, $k_{1,m}$=50 m²/year and $k_{2,m}$=5 m²/year. The incoming fractional flows at x=0 and y=50 km are 0,5. The initial composition of the basin is 0.5. The sequence duration is 10 Ma. The calculation grid is uniform Cartesian of size 40×20 cells, and the time interval is uniform, equal to 1 Ma. The synthetic example is constructed considering an initial bathymetry defined, in km, by $b_0(x)=A_0(x)=100(1-\cos\pi(x-y))$. The thickness of the first layer (l=0) to be calibrated is obtained by a calculation of the instationary model for an accommodation at the end of the sequence equal to $A_1(x)=400(1-\cos\pi(x+y))$. In addition to the thickness data, the solution is obtained that will serve as a reference, for the mean concentration in the layer and for the bathymetry at the end of the sequence. This reference solution will allow us to calculate the mean concentration and bathymetry errors at each iteration of the inversion algorithm.

Figure 5A:
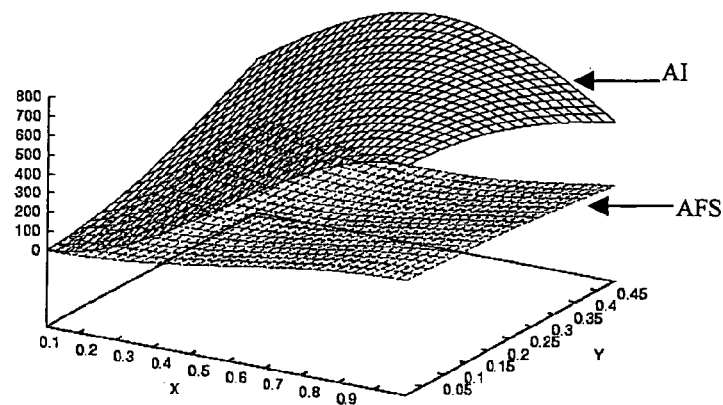
Figure 5B:
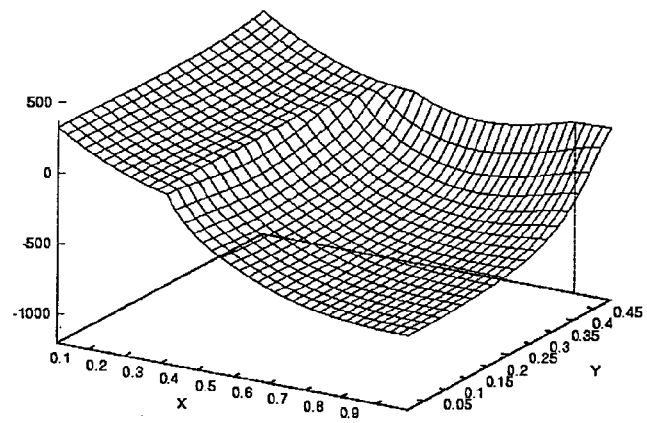
Figure 5C:
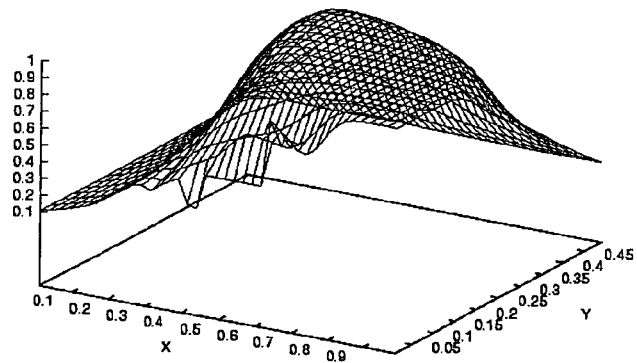
Figure 5D:
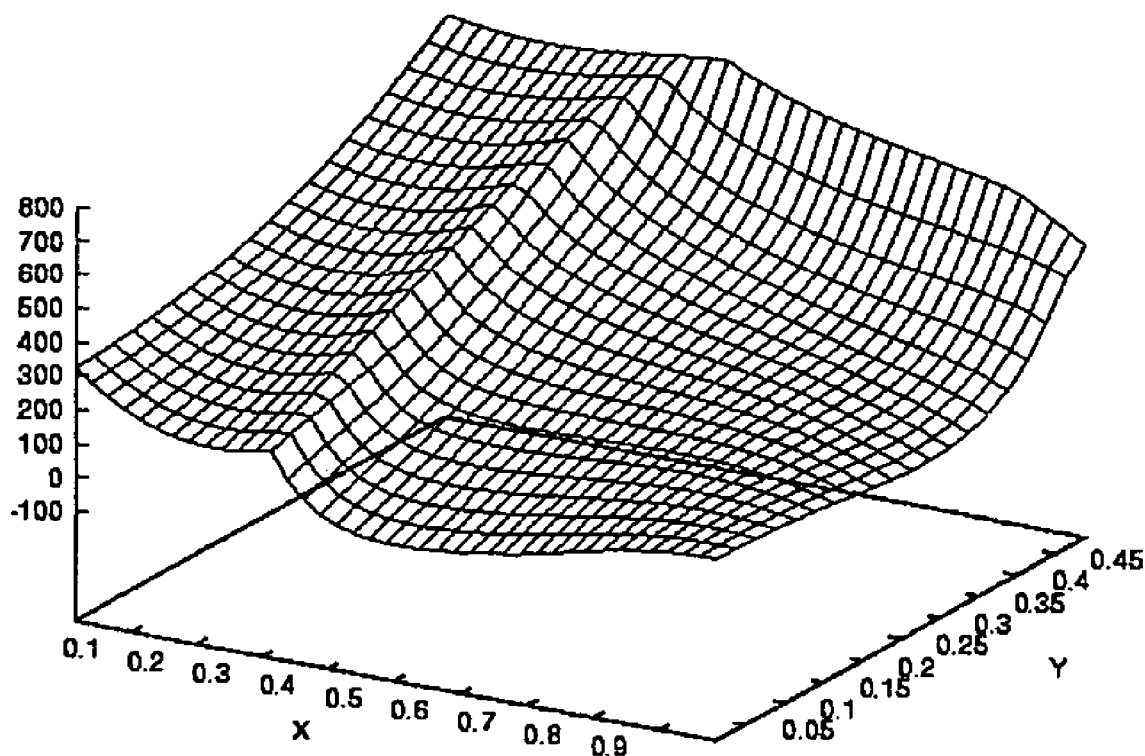

FIGS. 5A to 5D show the reference maps, that are. those forming the synthetic example and which are to be estimated by means of the method according to the invention. FIG. 5A shows the map of the initial accommodation (AI) and the map of the accommodation at the end of the sequence (AFS). FIG. 5B shows the reference solution map for the depositional profile (i.e. the opposite of the bathymetry) at the end of the sequence. FIG. 5C represents the mean concentration of the layer in lithology 1, and FIG. 5D the sediment thickness.

The method according to the invention is applied to this synthetic model. The thicknesses obtained are used as data of the inverse problem. Also imposed is the value $b^{o1}$ of the bathymetry obtained at the end of the sequence at control point $x_0^1$ of the grid. This control point corresponds to the point where the bathymetry is minimum in absolute value. The vertical dotted line in FIG. 5B allows to locate point $x_0^1$ where the bathymetry (or, in an equivalent way, the accommodation at the end of the sequence) is imposed.

FIGS. 6A to 6D show the results obtained by the method according to the invention in terms of error (vertical axis) and of number of iterations (horizontal axis). These figures show the convergence curves of the inversion loop with (PNL1, PNLi) and without (NPNL1, NPNLi) preconditioning, and for the two norms $L_1$(PNL1, NPNL1) and $L_\infty$(PNLi, NPNLi) respectively defined by:

$$\|u\|_1 = \frac{1}{\text{measure}(\Omega)}\int_\Omega |u(x)|dx \text{ and } \|u\|_\infty = \sup_{x\in\Omega}|u(x)|.$$

Figure 6A:
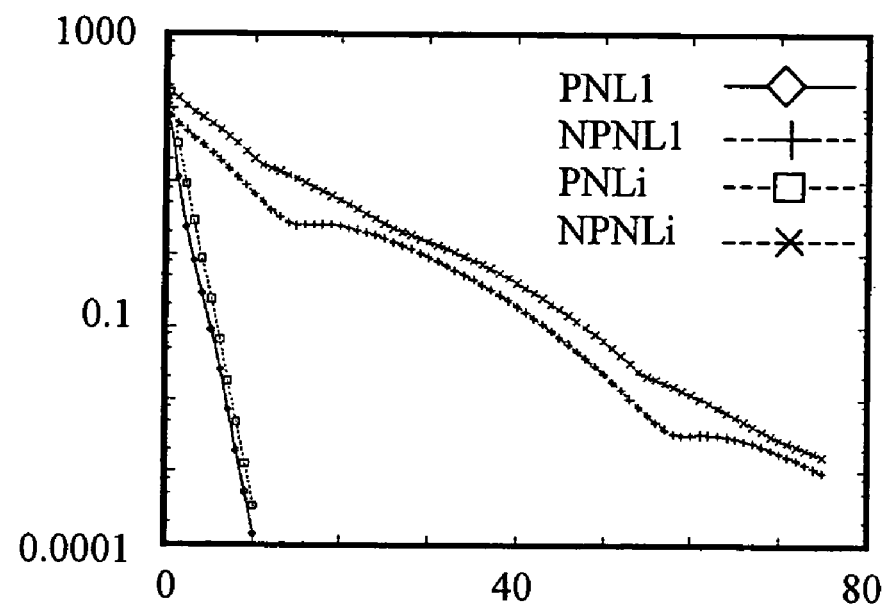
FIGS. 6A to 6D show the results obtained by means of the method according to the invention, in terms of error (vertical axis) and of number of iterations (horizontal axis)
Figure 6B:
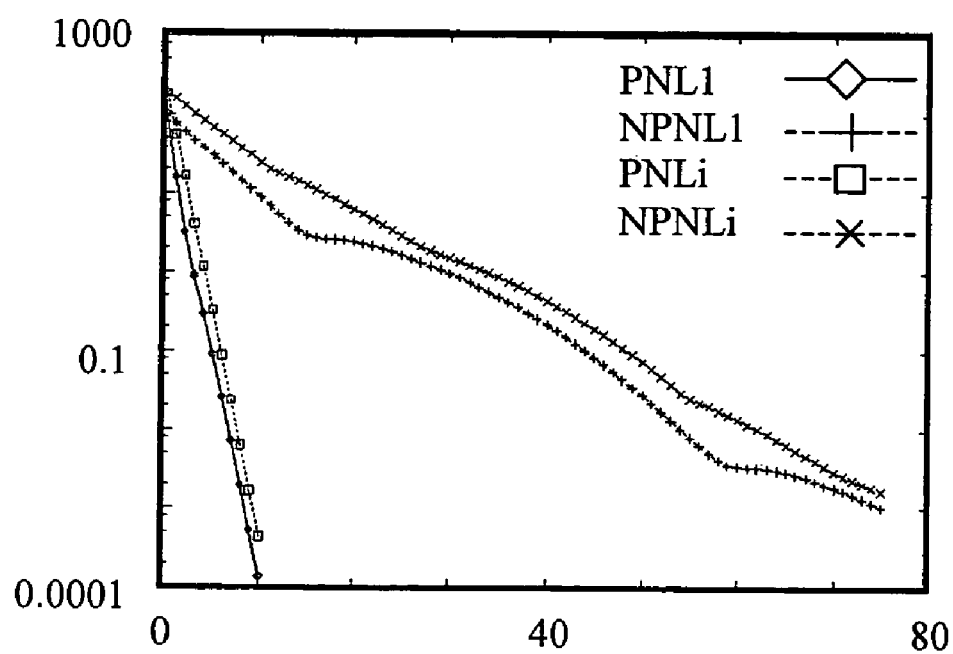
Figure 6C:
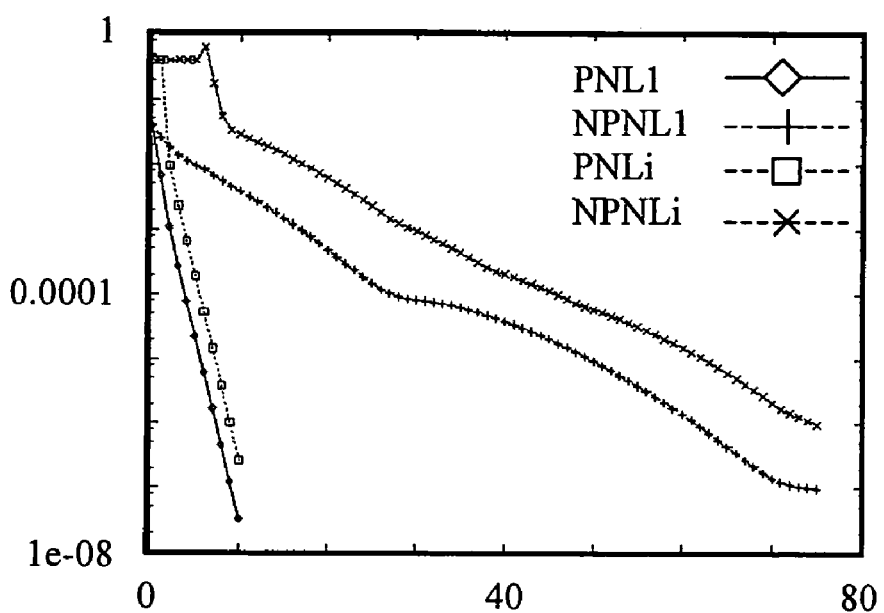
Figure 6D:
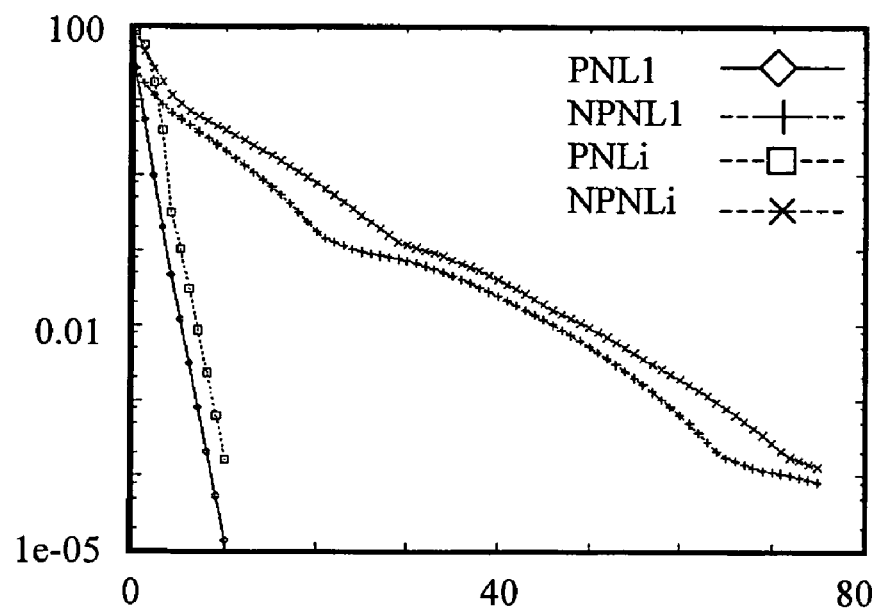

FIG. 6A illustrates these results for the bathymetry error at the end of the sequence, FIG. 6B for the accommodation error at the end of the sequence, FIG. 6C for the mean concentration errors and, finally, FIG. 6D illustrates these results for the residue on the sediment thickness.

The two algorithms with and without preconditioning are initialized with the stationary model. The very high convergence rate gain obtained for the algorithm with preconditioning can be clearly observed.

The invention claimed is:

1. A method for forming a model of a spatial distribution of a lithologic composition of sediments deposited in a sedimentary basin having sedimentary sequences, and a temporal evolution of bathymetry, comprising:

estimating, from interpretations of measurements resulting from seismic surveys and well data, input data comprising:

maps giving current thicknesses of the sedimentary sequences;

a map of initial topography of a basement of the sedimentary basin;

a distribution of a sedimentary supply in the basin, comprising at least descriptions of location in space, lithologic composition, and evolution of supply volume in time during filling of the basin; and diffusion coefficient values characterizing transport of the sediments to the basin; and establishing the three-dimensional map by applying the input data to a first iterative inversion procedure, comprising:

calculating a thickness of each of the sequences by solving instationary diffusive transport equations;

updating an accommodation at an end of each of the sequences by applying a second iterative procedure, comprising calculating a residue between current thicknesses of the sedimentary sequences and calculated thicknesses, and correcting the accommodation by preconditioning the residue until a sufficiently low residue is obtained on the thicknesses; and locating hydrocarbon reservoirs from the three-dimensional map.

2. A method as claimed in claim 1, wherein the accommodation at the end of a given sequence is initialized by the accommodation at the end of the sequence provided by a stationary diffusive model.

3. A method as claimed in claim 1, wherein preconditioning is obtained by application to the residue, on the thicknesses, of a tangent stationary diffusive model.

4. A method as claimed in claim 1, wherein an initial accommodation of a sequence is determined by a final accommodation calculated for the sequence located immediately below a sequence which is considered.

5. A method as claimed in claim 1, wherein mean values in time of the sedimentary supply for a sequence are considered in stationary and tangent stationary models.

6. A method as claimed in claim 1 wherein, when close to convergence, updating the accommodation at the end of each of the sequences is obtained by calculation of a Newton step of an inverse problem.

7. A method as claimed in claim 2, wherein preconditioning is obtained by application to the residue, on the thicknesses, of a tangent stationary diffusive model.

8. A method as claimed in claim 7, wherein an initial accommodation of a sequence is determined by a final accommodation calculated for the sequence located immediately below a sequence which is considered.

9. A method as claimed in claim 8, wherein mean values in time of the sedimentary supply for a sequence are considered in stationary and tangent stationary models.

10. A method as claimed in claim 7, wherein mean values in time of the sedimentary supply for a sequence are considered in stationary and tangent stationary models.

11. A method as claimed in claim 2, wherein an initial accommodation of a sequence is determined by a final accommodation calculated for the sequence located immediately below a sequence which is considered.

12. A method as claimed in claim 11, wherein mean values in time of the sedimentary supply for a sequence are considered in stationary and tangent stationary models.

13. A method as claimed in claim 2, wherein mean values in time of the sedimentary supply for a sequence are considered in the stationary and tangent stationary models.

14. A method as claimed in claim 2 wherein, when close to convergence, updating the accommodation at the end of each of the sequences is obtained by calculation of Newton step of an inverse problem.

15. A method as claimed in claim 3, wherein an initial accommodation of a sequence is determined by a final accommodation calculated for the sequence located immediately below a sequence which is considered.

16. A method as claimed in claim 15, wherein mean values in time of the sedimentary supply for a sequence are considered in stationary and tangent stationary models.

17. A method as claimed in claim 3, wherein mean values in time of the sedimentary supply for a sequence are considered in stationary and tangent stationary models.

18. A method as claimed in claim 3 wherein, when close to convergence, updating the accommodation at the end of each of the sequences is obtained by calculation of Newton step of an inverse problem.

19. A method as claimed in claim 4, wherein mean values in time of the sedimentary supply for a sequence are considered in stationary and tangent stationary models.

20. A method as claimed in claim 6, wherein a Newton step of the inverse problem is calculated by means of a generalized minimal residual algorithm preconditioned by a tangent stationary model.

* * * * *